United States Patent [19]

Ohnishi

[11] Patent Number: 4,737,762

[45] Date of Patent: Apr. 12, 1988

[54] VEHICLE THEFT DETECTOR FOR DETECTING THE PULLING OUT OF A LOCK

[75] Inventor: Kenichi Ohnishi, Toyota, Japan

[73] Assignee: Toyota Jidosha Kabushiki Kaisha, Toyota, Japan

[21] Appl. No.: 784,314

[22] Filed: Oct. 4, 1985

[30] Foreign Application Priority Data

Dec. 20, 1984 [JP] Japan .................... 59-193429[U]

[51] Int. Cl.$^4$ ............................................. B60R 25/10
[52] U.S. Cl. .................................... 340/63; 70/1.5;
180/287; 200/61.64; 200/61.66; 307/10 AT;
340/64; 340/542
[58] Field of Search .............. 340/63, 64, 541–543;
307/10 AT; 180/173, 287; 200/61.64, 61.66,
61.93, DIG. 26, 43.01, 43.11; 70/1.5, 262,
237–239, 416, 422

[56] References Cited

U.S. PATENT DOCUMENTS

| | | | |
|---|---|---|---|
| 3,597,949 | 4/1970 | Nigrelli | 70/1.5 |
| 3,760,617 | 9/1973 | Westerdale | 70/1.5 |
| 3,936,673 | 2/1976 | Kelly et al. | 340/63 |
| 4,029,919 | 6/1977 | Lumme | 200/61.66 |
| 4,151,508 | 4/1979 | Hensler et al. | 340/64 |
| 4,225,008 | 9/1980 | Colell et al. | 340/63 |
| 4,413,493 | 11/1983 | Meinsen et al. | 70/1.5 |
| 4,519,227 | 5/1985 | Dumbser et al. | 70/237 |
| 4,565,994 | 1/1986 | Mochida et al. | 340/542 |
| 4,574,268 | 3/1986 | Ohnishi | 340/64 |
| 4,595,903 | 6/1986 | Arlasky et al. | 307/10 AT |
| 4,635,035 | 1/1987 | Ratzabi | 340/63 |
| 4,638,292 | 1/1987 | Mochida et al. | 340/63 |

Primary Examiner—Donnie L. Crosland
Assistant Examiner—Brent A. Swarthout
Attorney, Agent, or Firm—Cushman, Darby & Cushman

[57] ABSTRACT

A vehicle theft detector apparatus includes a key cylinder attached to a door or an opening/closing part, this cylinder having a built-in key switch which sends locked and unlocked signals to an alarm device and a locking device, the lead wires from this lock switch leading to the alarm device and locking device via connectors. When the key cylinder is removed for the purpose of entering the vehicle, the lead wires attached to the cylinder are pulled out from the connector and then the thief enters the vehicle, the alarm is sounded and the thief detected. The above-mentioned detector apparatus is provided with apparatus for taking up the slack in the lead wires, thus ensuring that the connector is immediately disconnected no matter how slightly the cylinder is pulled outwards.

4 Claims, 4 Drawing Sheets

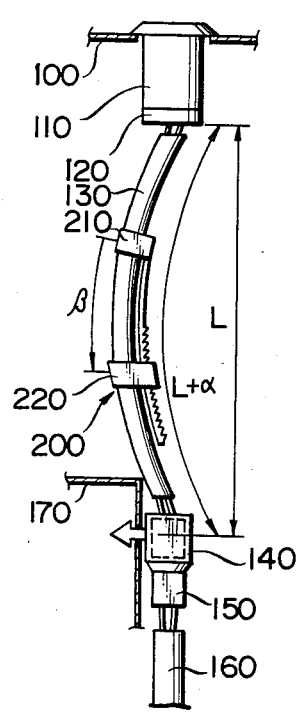
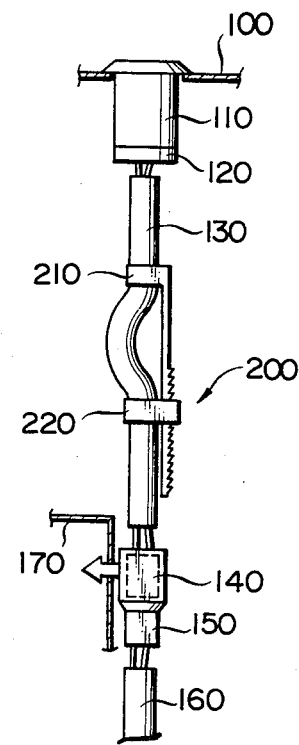

FIG. 3
FIG. 4
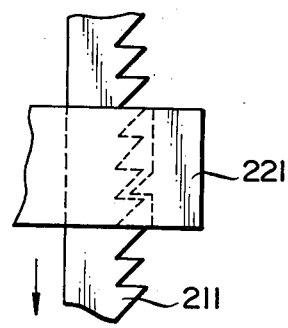
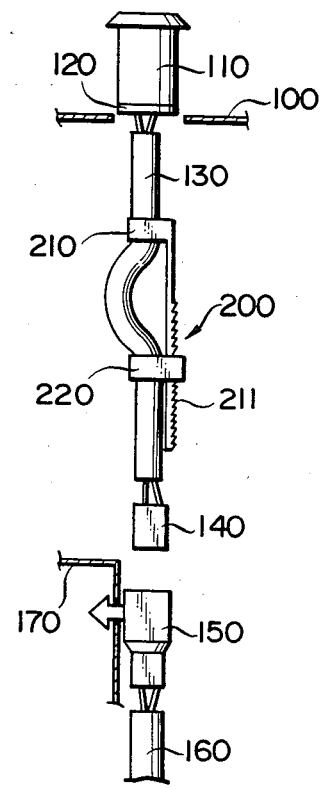

VEHICLE THEFT DETECTOR FOR DETECTING THE PULLING OUT OF A LOCK

BACKGROUND OF THE INVENTION

(1) FIELD OF THE INVENTION

The present invention relates to a theft detector apparatus used to detect illegal entry into a vehicle, and more particularly to a theft detector apparatus which prevents any circumvention of its working such as is possible in such theft detector apparatuses as can be circumvented when attempted entry into a vehicle by removing the key cylinder with its built-in lock switch and short-circuiting the lead wires connected to the key unlock switch in the cylinder.

(2) DESCRIPTION OF PRIOR ART

Conventional theft detector apparatuses work by detecting that a door etc. has been opened by a means other than a key, by which they judge that a theft has taken place, and sound an alarm. In other words, the conditions for this kind of apparatus to be set are that the door locking means must be locked and all the other possible openings into the car, such as the side doors, the rear door, the hatch, the trunk and so on securely closed as well. When the theft detector apparatus is set in this way, it will detect an illegal entry (theft) whenever a door or any of the other openings is opened by a means other than a key. On the basis of this it will sound an alarm by sounding the horn and switching on the head and tail lights.

However, this type of theft detector apparatus is set by locking the door even when the door is shut from the inside. Because of this, the apparatus suffers from the disadvantage that it will be activated and the alarm sounded when the occupant(s) try to get out of the vehicle.

In addition to this, the above-mentioned theft detector apparatus does not detect a theft when the door is simply unlocked using a means other than a key, but only does so when a door etc. is actually opened. As a result, if a means can be found to circumvent the switch etc. that senses whether or not the door is open, the door can be opened without activating the detector, a defect that leads to a loss of reliability.

Thus the inventor, as disclosed in the specifications of Japanese Patent Application No. 102839/1984, has developed a vehicle theft detector apparatus which cannot be set from within the car, and which also has improved reliability. This provides that after setting the locking means of either or both of the driver's door and the front passenger door to the locked position, the door can be locked from the outside by closing the door with the knob still in the open position, thus creating a 'keyless lock.' It further provides that it can only be set when it receives 'closed' signals from all of the openable parts, after first having received in succession an 'off' signal from the ignition key switch, an 'open' signal from at least one of the above-mentioned keyless locks, and locked signals from all of the door locking means. This means that it cannot be set from within the vehicle, and that as long as there is no unlock signal from a key, it will judge that a theft has taken place and sound the alarm if it receives one or more of the following signals: an open latch signal from a door or an opening part, or an unlock signal from any of the door locking means.

The lock and key unlock sensor of this conventional apparatus is arranged as shown in FIG. 5. In other words, the locking means 11 attached to the latch on the car door 10 on the car body is connected via a linking mechanism 12 to the manual door knob 13, and also via a linking mechanism 14 to the solenoid 15 of the magnetic lock, and again via a linking mechanism 16 to the door key cylinder 17. This solenoid 15 is arranged so as to be activated by the magnetic lock switch 18. As the door locking means 11 is arranged so that it can be operated by either the door lock knob 13, the magnetic lock switch 18 or the door cylinder 17, it can be locked and unlocked independently by any one of them. The arm 16a of the linking mechanism 16 pivots on the pivot 16, and its distal end is connected with the door cylinder 17 by the arm 16c. Thus the rotation of the cylinder 17 causes the arm 16c to move in an upward or downward direction. At the bottom of this arm 16a is provided a key unlock sensor constituted by a limit switch 6a. FIG. 5 shows arm 16a in an intermediate position, and in this position the keyhole 17a of the key cylinder 17 is as shown in FIG. 6 (A). When the door is unlocked by inserting the key into the keyhole 17a and turning it to the position shown in FIG. 6 (B), the arm 16a is moved by the arm 16c in the direction of the arrow 19 shown in FIG. 5, thus pushing the movable portion 20 of the limit switch to the position shown by the broken line in this Figure. It thus presses down on the sensor terminal 21 of the limit switch, which then outputs a key unlock signal.

However, the problem with the switch mechanism of this type of key unlock sensor is that if the key cylinder is removed from the outside of the door 10, the arm 16c of the link mechanism 16 can be clearly seen through the hole where the cylinder was, and if this arm 16c of the linking mechanism 16 is directly pressed down using a finger or some other means, the arm 16a will move downward in the direction of the arrow 19 in FIG. 5, rotating about the pivot 16b to press down the moving portion 20 onto, and thus activating the key unlock sensor 6a. This releases the theft detector apparatus, which means that such an action as removal of the cylinder renders the apparatus totally ineffective.

SUMMARY OF THE INVENTION

An object of this invention is to provide a theft detector apparatus which overcomes the defects of the above mentioned original technology.

Another object of this invention is to ensure that the theft detector apparatus alarm will always sound whenever the cylinder with its built-in key switch is removed from the door for the purpose of entering the vehicle.

Still another object of the invention is to provide a theft detector apparatus such that when the above-mentioned key switch cylinder is removed from the door to gain entry to the vehicle, the lead wires will always be removed together with the cylinder, then opening the circuit of the unlock switch. So when a thief unlocks the door, the alarm begins to sound.

A further object of the invention is to provide a theft detector apparatus such that when the key switch cylinder is removed from the door to gain entry to the vehicle, the connectors of the unlock switch are always disconnected from the alarm device. Thus when a thief enters the vehicle, the alarm begins to sound.

To these ends, according to the invention, connectors are installed at an intermediate point along the lead wires connecting the unlock switch cylinder and the locking means, so that when the cylinder is removed, these connectors are disconnected. When these connectors are disconnected, and the thief unlocks the door, the unlock signal is interrupted and the alarm sounds continuously.

However, if the lead wires are too long, the connectors will fail to be disconnected on removal of the cylinder, even if the cylinder is removed from the outer side of the door, and the lead wires removed with the cylinder can be short-circuited to send a key lock signal to the locking means and the alarm device, thereby circumventing the unlock switch built into the cylinder, and preventing the alarm from sounding.

According to another arrangement of this invention, therefore, a means is provided between the unlock switch and the connectors to take up the slack in the lead wires. In this way the connectors will disconnect however slightly the cylinder is pulled outwards in an attempt to remove it, thus breaking the key lock circuit and ensuring that the alarm device is operated.

BRIEF DESCRIPTION OF THE DRAWINGS

FIG. 2(A) shows a second embodiment of the invention incorporating a means of taking up the slack in the lead wires shown in the first embodiment in FIG. 1;

FIG. 2(B) illustrates how this means is used to take up the slack for the same separate embodiment;

FIG. 3 is an enlarged view of a portion of this slack-taking means;

FIG. 4 illustrates what happens when the cylinder is removed from the door with the slack in the lead wires taken up in the embodiment shown in FIG. 2;

DESCRIPTION OF THE PREFERRED EMBODIMENTS

Figure 1:
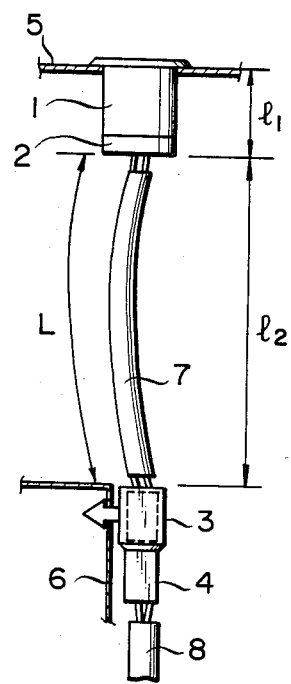
FIG. 1 illustrates how the connectors and the cylinder with its built-in lock switch are arranged relative to one another in a first embodiment of the vehicle theft detector apparatus according to this invention.
Figure 5:
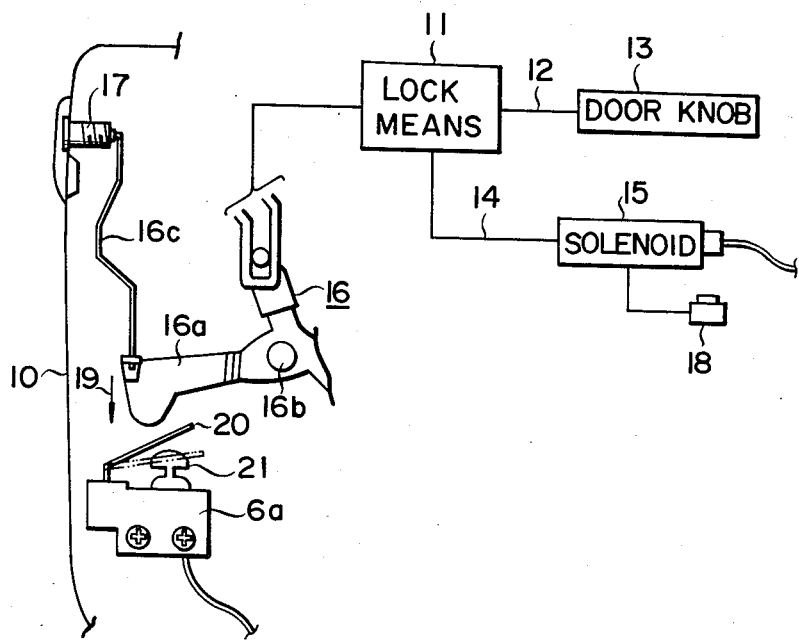
FIG. 5 illustrates the state of the prior art for the vehicle theft detector apparatus on which the present invention is based.
Figure 6A:
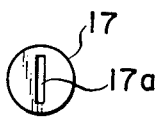
FIGS. 6(A) and 6(B) show the positions of the keyhole in the cylinder which operates the unlock sensor.
Figure 6B:
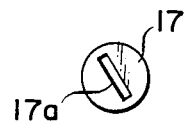

Refferring first to FIG. 1, the vehicle theft detector apparatus employs a cylinder 1 provided in the outer door panel 5 and having a built-in lock switch 2. The other end of the lead wires 7 that run from the lock switch 2 of this cylinder 1 are connected to a connector 3 on the switch side, and this connector 3 couples with another connector 4 which is fixed onto the inside of the car door by means of a metal holder 6. This connector 4 is in turn connected to lead wires 8, which run to the locking means and the alarm device (not shown in this Figure).

It is thus arranged so that the key unlock signal is transmitted to the locking means and the alarm device via the unlock switch 2 built into the cylinder 1 provided on the outer door panel 5, and the lead wires 7 attached to the connector 3, which couples with the connector 4 attached to the vehicle body. In this way, when the cylinder 1 is removed from outside the vehicle for the purpose of making an entry thereto, the cylinder 1, lead wires 7 and connector 3 are all pulled outwards, thus breaking the key lock circuit.

However, due to the looseness of the wires and for ease of assembly, the overall length L of the lead wires 7, relative to the distance $l_2$ between the lock switch 2 and the connector 4, is such that $$L > l_2 \tag{1}$$

In addition, taking into account the length $l_1$ of the cylinder 1, its relation to the overall length L of the lead wires 7 is arranged as follows:

$$l_2 < L < l_1 + l_2 \tag{2}$$

However, since the length of a normal cylinder 1 is as little as 30 mm, the lead wires are always longer than the required length due to looseness and for ease of assembly, so the disadvantage remains that it is not possible to ensure that the connector 3 will always be disconnected when the cylinder 1 is removed.

The present invention has overcome this problem, however, by providing a means of taking up the slack in the lead wires 7 connecting the connector 3 and the unlock switch 2 provided in the cylinder 1 of the vehicle theft detector apparatus of this invention. In other words, by taking up the slack in the lead wires 7, it ensures that when the cylinder 1 is removed, the connector 3 on the unlock switch side will be immediately disconnected from the connector 4 on the vehicle body, thus breaking the door lock signal circuit and causing the alarm to sound continuously.

The second embodiment of this invention will now be described.

In FIG. 2, a cylinder 110 is affixed to a door panel 100, and an unlock switch 120 is built into this cylinder 110. Connected to this unlock switch 120 are lead wires 130, which connect at their other end to an unlock-switch connector 140.

At the same time, a metal holder 170 is fixed on the inside of the door, to which is fixed a fastener on which is provided a locking means and alarm device connector 150. This device connector 150 is fixed to the metal holder 170 by means of this fastener. Lead wires are further connected to this connector 150, and run to the locking means and alarm device (not shown in the figure).

Furthermore, a tensioner 200 is attached to the lead wires 130 to take up the slack in the wires. This tensioner 200 comprises an upper clamp 210 and a lower clamp 220. The upper clamp 210 is clamped on the unlock switch end of the lead wires 130, while the lower clamp 220 is fixed to the connector 140 end of the lead wires 130. This upper clamp 210 is provided with a cylindrical or band-like adjustment member 211 having saw-teeth as shown in FIG. 3. This adjuster 211 meshes with a ratchet member 221 having teeth that match with those on the above adjuster, and which is provided on the lower clamp 220, so that the distance between the upper clamp 210 and the lower clamp 220 can be freely adjusted.

The relation of the length Lr of the lead wires 130 to the distance L between the cylinder 110 and the switch-side connector 140 is given, due to looseness and ease of installation, by the following:

$$Lr = L + \alpha \tag{3}$$

where $\alpha$ expresses the slack left in the wires when the connector 150 is fixed. In addition the relation of the distance $\beta$ between the upper clamp 210 and the lower clamp 220 when they are fixed onto the lead wires 130 to the slack $\alpha$ is expressed by $$\beta > \alpha. \tag{4}$$

Thus, after fixing the locking means and alarm device connector 150 to the metal holder 170, the lead wires 130 can be tensioned by pulling the adjuster 211 of the upper clamp 210 through the ratchet member 221 of the lower clamp 220 so as to bring the upper clamp near to the lower clamp 220 whilst holding the lower clamp, resulting in the arrangement shown in FIG. 2 (B). The adjuster 211 and the ratchet holder 221 can only move relative to one another in one direction, so that the more the adjuster 211 is pulled, the more the lead wires 130 are tensioned and the slack taken up. The slack taking up operation is performed only on installation.

With the apparatus now set as shown in FIG. 2(B), removal of the cylinder 110 will inevitably result in the switch side connector 140 being pulled out from the device connector 150 due to the force of removal transmitted via the lead wires 130, as shown in FIG. 4. In this case, the force required to pull out the switch side connector 140 and lead wires 130 is more than 10 kg. However, if the switch-side connector is of the semi-lock type, the force required is 5 kg.

As explained above, this embodiment thus ensures that any excess length in the lead wires due to looseness or ease of assembly can be amply compensated for.

This invention also provides that, due to the maintenance of tension in the lead wires, the connectors will inevitably be disconnected when the door cylinder is removed, thereby ensuring increased reliability for a theft detector apparatus.

What is claimed is:

1. A vehicle theft detector for detecting the pulling out of a lock comprising:
   locking means for locking and unlocking an opening/closing part of a vehicle;
   a cylinder with a built-in key-operated unlock switch which outputs locked and unlocked signals to said locking means to lock and unlock the part;
   an alarm device which is capable of being activated or deactivated responsive to the lock and unlock signals from said unlock switch respectively; and
   connecting means for transmitting said lock and unlock signals from said unlock switch to said alarm device and to said locking means; including
   a first connector connected to said unlock switch through lead wires,
   a second connector, which couples with said first connector, is fixed to the inside of the part and leads to said alarm device and to said locking means, wherein said alarm device is activated when a lock signal is output to said alarm device and said first and second connectors are uncoupled from each other, so that the lock signal transmitted from said unlock switch to said alarm device is interrupted.

2. A vehicle theft detector according to claim 1, wherein on installation of said detector there is slack in the lead wires and further comprising:
   means for taking up the slack in said lead wires.

3. A vehicle theft detector according to claim 2, wherein said means for taking up the slack comprises an upper clamp fixed to the wires near the cylinder, a band-like member fixed to said upper clamp, said member meshing with a ratchet member on a lower clamp fixed to the lead wires near the first connector.

4. A vehicle theft detector according to claim 3, wherein said member has a side with saw-teeth and said ratchet member on the lower clamp is provided with teeth that hold said saw-teeth side of said band-like member.

* * * * *